United States Patent
Wienand et al.

[11] Patent Number: 5,959,524
[45] Date of Patent: Sep. 28, 1999

[54] TEMPERATURE SENSOR

[75] Inventors: Karlheinz Wienand, Aschaffenburg; Margit Sander, Karlstein; Stefan Dietmann, Haiterbach; Werner Englert, deceased, late of Alzenau, all of Germany, by Maria Englert, heir

[73] Assignee: Heraeus Electro-Nite International N.V., Houthalen, Belgium

[21] Appl. No.: 08/613,703

[22] Filed: Mar. 11, 1996

[30] Foreign Application Priority Data

Nov. 15, 1995 [DE] Germany ............... 195 42 516

[51] Int. Cl.$^6$ ............................................. H01C 7/10
[52] U.S. Cl. .................... 338/28; 338/25; 338/229
[58] Field of Search ........................... 338/25, 28, 29, 338/30, 229, 234, 237

[56] References Cited

U.S. PATENT DOCUMENTS

| | | | |
|---|---|---|---|
| 2,766,367 | 10/1956 | Chaustowich | 219/523 |
| 3,634,840 | 1/1972 | Wilkinson | 340/595 |
| 4,291,576 | 9/1981 | Deane | 374/155 |
| 4,934,831 | 6/1990 | Volbrecht | 374/183 |
| 5,015,987 | 5/1991 | Nixon et al. | 338/22 R |
| 5,046,857 | 9/1991 | Metzger et al. | 374/135 |
| 5,071,258 | 12/1991 | Usher et al. | |
| 5,302,934 | 4/1994 | Hart et al. | 338/22 R |
| 5,367,282 | 11/1994 | Clem | 338/22 R |
| 5,481,240 | 1/1996 | Fukaya et al. | 338/22 R |

FOREIGN PATENT DOCUMENTS

| | | |
|---|---|---|
| 0 327 535 B1 | 9/1991 | European Pat. Off. |
| 0 471 138 B1 | 12/1994 | European Pat. Off. |
| 1 648 261 | 5/1971 | Germany . |
| 3012787 | 10/1981 | Germany .............. 338/25 |
| 0 498 386 A1 | 8/1992 | Germany . |
| 389 275 | 7/1965 | Switzerland . |

*Primary Examiner*—Lincoln Donovan
*Assistant Examiner*—Karl Easthom
*Attorney, Agent, or Firm*—Panitch Schwarze Jacobs & Nadel, P.C.

[57] ABSTRACT

In a temperature sensor with a platinum resistance thermometer accommodated in a tube-shaped housing, the platinum resistance layer belonging thereto should be protected against pollution or contamination of the platinum, since the electrochemical characteristics of platinum can be reduced by substances in the surroundings in the event of too low a partial pressure of oxygen. For this purpose, a mechanically solid and liquid-impermeable, connection is provided in the connection region of the tube-shaped housing, which permits an admission of air-oxygen into the housing from the environment of the connecting cable. The air-oxygen admission is made possible through a liquid-impermeable oxygen-permeable jacket for the connecting cable and/or over an accompanying connecting plug, whereby the admission of air-oxygen takes place along a glass filament filler running parallel to the electrical leads inside the jacket of the connecting cable.

21 Claims, 2 Drawing Sheets

TEMPERATURE SENSOR

FIELD OF THE INVENTION

The invention concerns a temperature sensor with a platinum-containing temperature-dependent measurement resistance with a housing connected to a conducting lead, whereby the surface of the measurement resistance is separated from the ambient atmosphere by means of an oxygen-permeable diffusion barrier, and the measurement resistance is connected to at least one conducting lead through at least one contact pad.

BACKGROUND OF THE INVENTION

A temperature sensor with a platinum resistance thermometer is known from EP 0 327 535 B1, whereby the platinum resistance layer is covered with a protective layer, which consists of a dielectric layer and a diffusion barrier layer. A pollution or contamination of the platinum as the measuring element should be prevented by such a construction, since the electrochemical characteristics of platinum can be reduced by surrounding substances when the oxygen partial pressure is too low.

The attachment inside a protective housing proves to be problematic with such a resistance thermometer, whereby in practice a premature destruction can result from deficient vibration resistance and shock resistance.

SUMMARY OF THE INVENTION

The object of the present invention is to produce a robust temperature sensor, in which the temperature measuring element is stably mounted inside its housing, in order to guarantee long-term stable measurements in the temperature range up to 1000° C. Furthermore, a sufficient diffusion of atmospheric oxygen should be assured within the interior of the housing, in order to avoid platinum pollution on account of too low an oxygen partial pressure in the environment of the measuring element.

The object is attained according to the invention by the measurement resistance having a gas- and liquid-impermeable housing connected with a connecting cable by at least one connecting lead running through a protective tube, and the connection between the housing and the connecting cable being mechanically solid and liquid-impermeable, while permitting an admission of air-oxygen from the ambient surroundings of the connecting cable into the housing.

It proves to be especially advantageous for the housing to be capable of installation in existing facilities, and to be able to be used, for example, for measuring the catalyzer temperature in exhaust gas systems for motor vehicles.

In one advantageous construction a glass filament filler is provided inside the connecting cable, which makes possible an oxygen permeation from the plug area of the connecting cable to the connection region of the connecting cable.

The high stability in the region between the housing and the connecting cable, owing to two encircling roller crimps of the coupling, proves to be particularly advantageous.

Further advantageous constructions of the subject of the invention include providing the connecting cable with a jacket which is liquid-impermeable but oxygen-permeable to permit permeation of air-oxygen into the housing. The jacket may be made of silicone and may have a thickness in the range of about 1 mm to about 6 mm. The total oxygen permability to the housing, including both oxygen transmission from the plug along the cable and transverse permeability through the jacket of the cable, should be at least 0.05 millibar liter/second.

The simple and inexpensive preparation of the signals in the evaluation circuit connected thereto turns out to be especially beneficial. In addition, the relatively high signal potential in the voltage range in relation to signals from the thermoelements is largely insensitive to disturbances.

BRIEF DESCRIPTION OF THE DRAWINGS

The foregoing summary, as well as the following detailed description of a preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown.

DETAILED DESCRIPTION OF PREFERRED EMBODIMENTS

Figure 1:
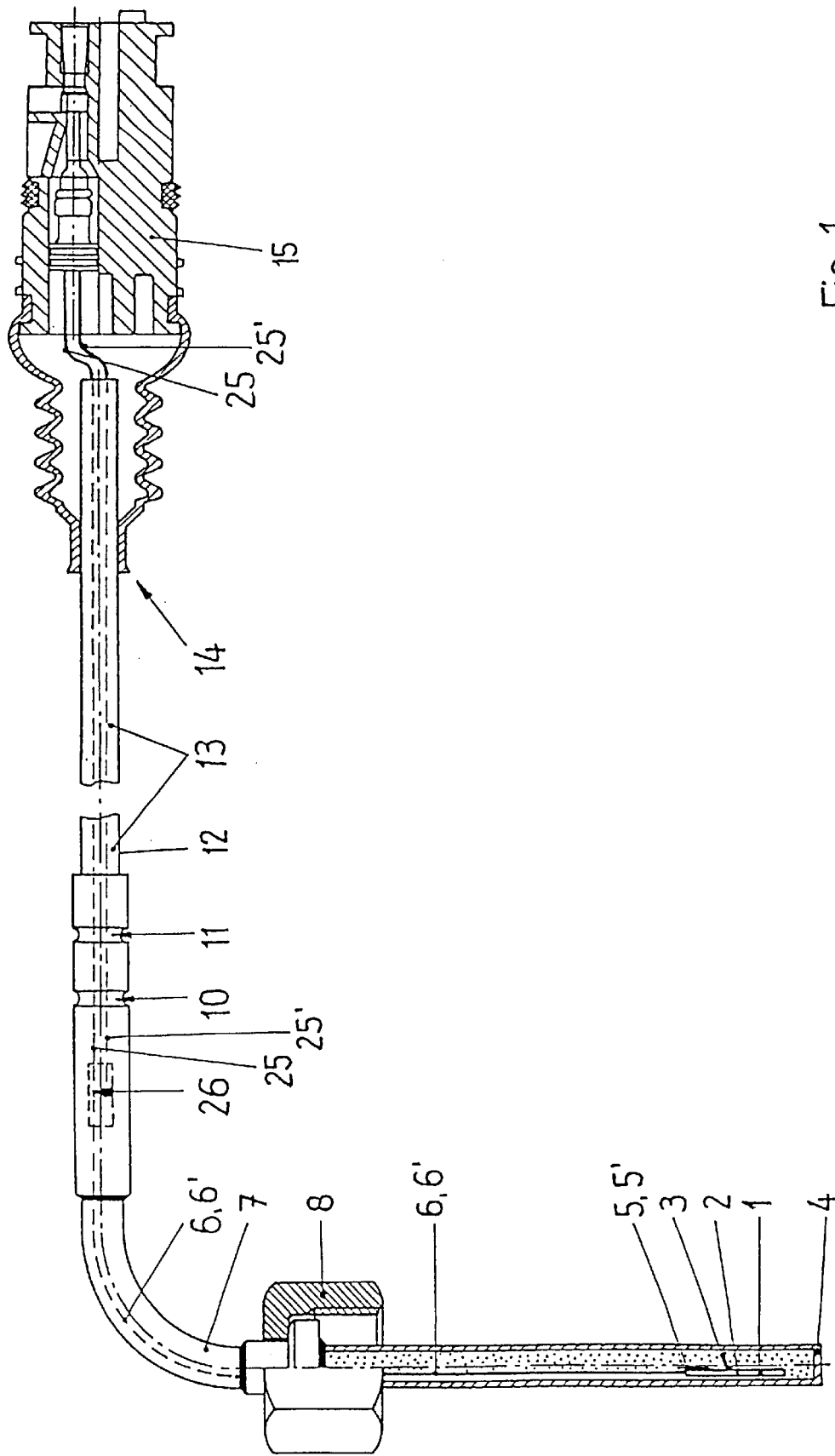
FIG. 1 schematically depicts a screw-in resistance thermometer partially broken away in longitudinal section.

According to FIG. 1, the temperature-dependent resistance element 1 comprises an electrically insulating substrate 2 to which the resistance layer 3 is applied as a thin layer or as a film. The resistance element 1 is held by form-fitting (positive) locking by means of ceramic casting compound in the end region of a tube-shaped housing 4 made of a nickel alloy and comprising a tube section closed on one end.

Such a measurement resistance is known, for example, from EP 0 471 138 B1, in which the substrate comprises a ceramic, preferably aluminum oxide, while the platinum thin film is applied in the form of a meander, is connected to conducting lead 6, 6' made of high temperature-resistant material through contact plates 5, 5'. The conducting lead 6, 6' is located in a high temperature-resistant protective tube 7 made of a nickel alloy, which is joined by means of a screw connection 8 with the housing 4, likewise made of high temperature-resistant material, for installation of resistance element 1.

The conducting lead 6, 6' is joined with conducting leads 25, 25' of a connecting cable 13 in the connection region 26 or in the area of two axially adjacent roller crimps 10, 11, the connecting cable 13 having a silicone jacket 12 and lying outside the high temperature zone. The connecting cable is held through the roller crimps by squeezing on the jacket 12. The end 14 of the connecting cable 13 is provided with a connecting plug 15 from whence a determined temperature signal is conducted to evaluator electronics.

Figure 3:
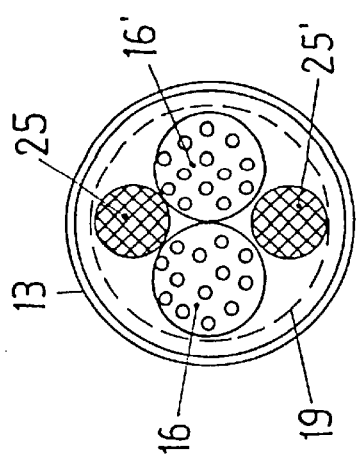
FIG. 3 shows the cross section of the conducting cable with glass filament filler.

In addition to the two conducting leads 25, 25', the connecting cable 13 contains a glass filament filler 16, 16' running in a longitudinal direction of the cable, as shown in more detail in FIG. 3, which improves the admission of air-oxygen running in a longitudinal direction up to the housing 4.

The conducting leads 25, 25' within the connecting cable 13 preferably comprise copper strands, while the silicone jacket 12 has a usual porosity, so that on the one hand it is waterproof without needing anything further, but on the other hand it cannot be designated as vacuum tight. Owing to the porosity of the silicone jacket 12 and the open end in the plug 15, air-oxygen enters the interior of the connecting cable 13 by diffusion and spreads itself along the interstices of the glass filament filler or between the copper strands serving as conducting leads 25, 25' up to the housing 4 of the measurement resistance 1.

Figure 2:
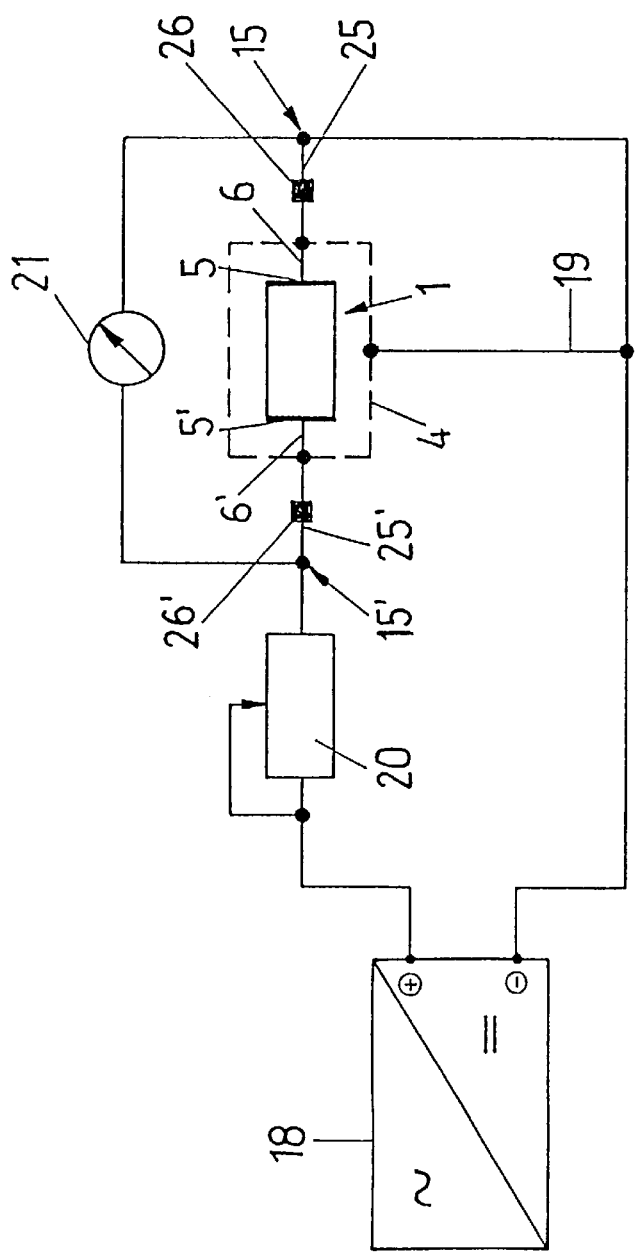
FIG. 2 shows a circuit arrangement for operating the temperature measuring element.

FIG. 2 depicts schematically a measurement device with the temperature sensor according to the invention. The measurement resistance 1 is therein surrounded by a housing 4 acting as electrical screening, whereby the contact pads 5, 5' are connected with the wires 6, 6' of the conducting lead. The connecting plug 15 and the connection region 26 are divided into junctions 15, 15' and 26, 26' for better illustration of the circuit arrangement. The conducting lead 6, 6' is connected with the conducting lead 25, 25' of the connecting cable outside the high temperature range in the region of the junctions 26, 26', the ends of the conducting lead 25, 25' terminating at the connecting plugs 15, 15'.

The housing 4 is connected with the negative terminal of a direct current supply 18 via lead 19, which is constructed for example as a metal jacket or shield at ground potential, whereby the negative bias voltage of the housing 4 counteracts the formation of a local element in the interior of the housing. Furthermore, a temperature-independent balancing resistor or a temperature-independent potentiometer 20 is connected in series with the measurement resistance in the resistance measuring circuit. The indication of the temperature determined by the measurement resistance 1 takes place over a voltmeter 21 connected in parallel with resistance 1.

One can recognize from the cross section of the connecting cable 13 shown in FIG. 3 that a glass filament filler 16, 16' is provided parallel to the leads 25, 25' which, due to its oxygen permeability and the interstices visible in the cross section, makes possible an admission of oxygen over connection region 26 in protective tube 7 and into the tube-shaped resistance housing 4 according to FIGS. 1 and 2. The connection of the housing 4 with the negative pole of the current supply 18 can, for example, take place through a metallic screening or sheathing as lead 19, which surrounds the mutually electrically insulated conducting leads 25, 25' in an electrically insulating manner. This can also occur, however, by means of the metal mass, which reaches the housing 4 with the negative pole of the current supply as well as through the screw coupling 8.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A temperature sensor comprising:
    a platinum-containing temperature-dependent measurement resistance (1);
    an oxygen-permeable diffusion barrier, wherein the platinum-containing temperature-dependent measurement resistance (1) is shielded from ambient atmosphere by the oxygen-permeable diffusion barrier;
    at least one conducting lead (6, 6') and at least one contact pad (5, 5'), the conducting lead (6, 6') being electrically connected to the temperature-dependent measurement resistance (1) by the at least one contact pad (5, 5');
    a gas- and liquid-impermeable housing (4) surrounding the at least one conducting lead (6, 6'), the at least one contact pad (5, 5'), and the temperature-dependent measurement resistance (1);
    a ceramic casting compound disposed between the temperature-dependent measurement resistance (1) and the gas- and liquid-impermeable housing (4), wherein the ceramic casting compound is form-fitting of the temperature-dependent measurement resistance (1), and holds the temperature-dependent measurement resistance (1) stably within the housing (4);
    a connecting cable (13) having a first end and a second end, the first end of the connecting cable (13) being electrically connected with the measurement resistance (1) by the at least one conducting lead (6, 6'); and
    a protective tube (7) providing a mechanically solid and liquid-impermeable connection between the connecting cable (13) and the housing (4), the connection permitting an admission of air-oxygen from the ambient atmosphere through the connecting cable, and in a longitudinal direction with respect to the connecting cable (13), into the housing (4), the at least one conducting lead (6, 6') running through the protective tube (7) to provide the electrical connection between the measurement resistance (1) and the connecting cable (13).

2. The temperature sensor according to claim 1 further comprising a connection region (26), wherein the connection region (26) is squeezed onto the first end of the connecting cable (13) by means of at least two roller crimps (10, 11).

3. The temperature sensor according to claim 1 wherein the admission of air-oxygen takes place at least through the second end of the connecting cable.

4. The temperature sensor according to claim 3, further comprising:
    a connecting plug (15) having an open end and a second end, the second end of the connecting plug (15) being attached to the second end of the connecting cable (13), wherein the admission of air-oxygen takes place through the open end of the connecting plug (15).

5. The temperature sensor according to claim 1, wherein the connecting cable (13) further comprises a jacket (12).

6. The temperature sensor according to claim 5, further comprising roller crimps, wherein the roller crimps hold the first end of the connecting cable (13) in the protective tube (7).

7. The temperature sensor according to claim 5, wherein the connecting cable (13) further comprises at least one conducting lead (25, 25') running through the connecting cable (13) and being electrically connected to the at least one conducting lead (6, 6').

8. The temperature sensor according to claim 7, further comprising a glass filament filler (16) running parallel to the at least one conducting lead (25, 25') in the jacket (12) of the connecting cable (13), and wherein the admission of air-oxygen takes place in a longitudinal direction with respect to the connecting cable (13) along the glass filament filler (16).

9. The temperature sensor according to claim 5, wherein the jacket (12) is liquid-impermeable and oxygen-permeable and permits the admission of air-oxygen into the housing (4).

10. The temperature sensor according to claim 9, wherein the jacket (12) comprises silicon and has a thickness in the range of about 1 mm to about 6 mm.

11. The temperature sensor according to claim 5, wherein the connecting cable (13) further comprises a glass filament filler (16) and the admission of air-oxygen takes place in a longitudinal direction of the connecting cable (13) along the glass filament filler (16).

12. The temperature sensor according to claim 1, wherein said connecting cable (13) further comprises a jacket (12)

and a connecting plug (15) having an open end and a second end, the second end of the connecting plug (15) being attached to the second end of the connecting cable (13), and wherein total oxygen admission to the housing (4) amounts to at least 0.05 millibar liter/second both in a longitudinal direction with respect to the connecting cable (13) through the open end of the connecting plug (15) and transversely through the jacket (12).

13. A temperature sensor comprising:
   a platinum-containing temperature-dependent measurement resistance (1);
   an oxygen-permeable diffusion barrier, wherein the platinum-containing temperature-dependent measurement resistance (1) is shielded from ambient atmosphere by the oxygen-permeable diffusion barrier;
   at least one conducting lead (6, 6') being electrically connected to said temperature-dependent measurement resistance (1);
   a gas- and liquid-impermeable housing (4) surrounding the at least one conducting lead (6, 6'), and the temperature-dependent measurement resistance (1);
   a ceramic casting compound disposed between the temperature-dependent measurement resistance (1) and the gas- and liquid-impermeable housing (4), wherein the ceramic casting compound is form-fitting of the temperature-dependent measurement resistance (1), and holds the temperature-dependent measurement resistance (1) stably within the housing (4);
   a connecting cable (13) having a first end and a second end, the first end of the connecting cable (13) being electrically connected with the measurement resistance (1) by the at least one conducting lead (6, 6'), the connecting cable (13) providing an admission of air-oxygen from the ambient atmosphere into the housing (4);
   wherein the connecting cable (13) and the housing (4) have a mechanically solid and liquid-impermeable connection which allows the admission of air-oxygen into the housing (4) through, and in a longitudinal direction with respect to, the connecting cable (13) to prevent pollution or contamination of the temperature-dependent measurement resistance (1).

14. The temperature sensor according to claim 13, further comprising a connecting plug (15) having an open end and a second end, the second end of the connecting plug (15) being attached to the second end of the connecting cable (13) and wherein the admission of air-oxygen takes place through the open end of the connecting plug (15).

15. The temperature sensor according to claim 13, wherein the connecting cable (13) further comprises a glass filament filler (16) wherein the admission of air-oxygen takes place through the connecting cable (13), in a longitudinal direction with respect to the connecting cable, along the glass filament filler (16).

16. The temperature sensor according to claim 15, wherein the connecting cable (13) further comprises a jacket (12) which is liquid-impermeable and oxygen-permeable and permits admission of air-oxygen into the housing (4).

17. The temperature sensor according to claim 16, wherein the jacket (12) is made of silicon having a thickness in the range of about 1 mm to about 6 mm.

18. The temperature sensor according to claim 16, wherein the connecting cable (13) further comprises a connection plug (15) having an open end and a second end, the second end of the connecting plug (15) being attached to the second end of the connecting cable (13) wherein admission of air-oxygen takes place through the open end of the connecting plug (15), and wherein total oxygen admission to the housing (4) amounts to at least 0.05 millibar liter/second both in a longitudinal direction, with respect to the connecting cable (13), through the connection plug (15), and transversely through the jacket (12).

19. The temperature sensor according to claim 13, further comprising a connection region (26) and at least two roller crimps (10, 11), wherein the first end of the connecting cable is held in place at the connection region by the at least two roller crimps (10, 11).

20. The temperature sensor according to claim 13, wherein the connecting cable (13) further comprises at least one conducting lead (25, 25') running through the connecting cable (13) and being electrically connected to the at least one conducting lead (6, 6').

21. The temperature sensor according to claim 13, wherein the connecting cable further comprises a jacket (12) which is liquid-impermeable and permits admission of air-oxygen into the housing (4).

* * * * *